United States Patent
Yi et al.

(10) Patent No.: US 12,524,549 B2
(45) Date of Patent: Jan. 13, 2026

(54) METHOD OF UPDATING SOFTWARE OF ELECTRONIC CONTROL UNIT OF VEHICLE

(71) Applicant: Hyundai AutoEver Corp., Seoul (KR)

(72) Inventors: Jun Min Yi, Seoul (KR); Jun Sung Yang, Seoul (KR)

(73) Assignee: Hyundai AutoEver Corp., Seoul (KR)

( * ) Notice: Subject to any disclaimer, the term of this patent is extended or adjusted under 35 U.S.C. 154(b) by 137 days.

(21) Appl. No.: 18/397,213

(22) Filed: Dec. 27, 2023

(65) Prior Publication Data
US 2024/0220625 A1    Jul. 4, 2024

(30) Foreign Application Priority Data

Dec. 28, 2022  (KR) .................. 10-2022-0187801

(51) Int. Cl.
*G06F 21/57* (2013.01)
(52) U.S. Cl.
CPC .......... *G06F 21/572* (2013.01); *G06F 21/575* (2013.01)
(58) Field of Classification Search
CPC .... G06F 21/572; G06F 21/575; G06F 3/1224; G06F 8/65; G06F 11/1433; G06F 11/1458; G06F 11/1448
See application file for complete search history.

(56) References Cited

U.S. PATENT DOCUMENTS

| | | | |
|---|---|---|---|
| 9,916,151 B2 * | 3/2018 | Ye | H04W 12/10 |
| 2018/0189049 A1 | 7/2018 | Madrid et al. | |
| 2021/0263746 A1 * | 8/2021 | Thom | G06F 3/0685 |
| 2022/0181012 A1 | 6/2022 | Skelton et al. | |
| 2022/0405080 A1 * | 12/2022 | Ishikawa | H04W 8/205 |
| 2023/0004649 A1 * | 1/2023 | Su | G06F 11/1469 |
| 2025/0005160 A1 * | 1/2025 | Jayaramareddy | G06F 21/575 |

FOREIGN PATENT DOCUMENTS

| | | | | |
|---|---|---|---|---|
| EP | 4618488 A1 * | 9/2025 | ........... | G06F 21/572 |
| KR | 10-2014-0057739 A | 5/2014 | | |

* cited by examiner

*Primary Examiner* — Hyun Soo Kim
(74) *Attorney, Agent, or Firm* — Bridgeway IP Law Group, PLLC; Jihun Kim (57) ABSTRACT

A method of updating software of an Electronic Control Unit (ECU) includes: downloading a boot loader to a boot area of a second memory bank in an inactive state, and downloading a firmware or data to a normal area, when a first memory bank is in an active state; setting the second memory bank, which is in the inactive state, as a memory bank to operate in the active state after a reset of the ECU; and resetting the ECU to cause the second memory bank to operate in the active state.

8 Claims, 5 Drawing Sheets

METHOD OF UPDATING SOFTWARE OF ELECTRONIC CONTROL UNIT OF VEHICLE

CROSS-REFERENCE TO RELATED APPLICATIONS

This application claims priority to and the benefit of Korean Patent Application No. 10-2022-0187801 filed in the Korean Intellectual Property Office on Dec. 28, 2022, the entire contents of which are incorporated herein by reference.

TECHNICAL FIELD

The present invention relates to a method of updating software of an Electronic Control Unit (ECU) of a vehicle.

BACKGROUND ART

Today's vehicles are equipped with Electronic Control Units (ECUs) that control an engine, an automatic transmission, an Anti-lock Braking System (ABS), and the like. Many of the ECUs installed in vehicles have different software installed, but has high possibility that the software has an error, which causes problems while the vehicle is in operation. To prevent this, when the software of an ECU is developed, simulations are used to find software errors and make corrections for software errors, new software errors may be discovered while the vehicle is in operation, so that there is always a need for updates (also known as "reprogramming") to the software of the ECU.

In general, ECU software updates use diagnostic communication through a wired connection between the vehicle and the diagnostic tool, which is slow and requires a visit to a place, such as a repair shop, equipped with a diagnostic tool every time an update is needed. In recent years, Over-The-Air (OTA) services have become available to update software wirelessly. Through this, it is possible to perform software updates efficiently, safely, and quickly, and reduce software recalls and associated costs.

On the other hand, software updates via a wired connection between the vehicle and the diagnostic tool can update not only the firmware and data in the normal area of the flash memory, but also the boot loader in the boot area, and it is also possible to recover the data to the state before the update when an error occurs during the update process.

However, while OTA software updates can update firmware and data in the normal area of the flash memory, the technology to update the boot loader in the boot area has not yet been implemented. Therefore, in the event of a failure in the boot area, there is a problem in that the hardware of the ECU itself needs to be inevitably replaced.

SUMMARY OF THE INVENTION

The present invention has been made in an effort to provide a method of updating software of an Electronic Control Unit (ECU), which is capable of updating a boot loader, as well as firmware or data in a flash memory in an Over The Air (OTA) software update.

The present invention has also been made in an effort to provide a method of updating software of an Electronic Control Unit (ECU), which is capable of recovering a boot loader, firmware, or data to a state before the update when there is abnormality in newly downloaded firmware or data during an update of a boot loader and firmware or data in a flash memory.

An object to be solved in the present invention is not limited to the aforementioned objects, and other objects not-mentioned herein will be clearly understood by those skilled in the art from descriptions below.

An exemplary embodiment of the present invention provides a method of updating software of an Electronic Control Unit (ECU), in which a flash memory of the ECU includes a first memory bank and a second memory bank, each of the first memory bank and the second memory bank includes a boot area for storing a boot loader and a normal area for storing firmware or data, and when one of the first and second memory banks operates in an active state and the other operates in an inactive state, the method of updating software including: downloading the boot loader to the boot area of the second memory bank in an inactive state, and downloading the firmware or data to the normal area, when the first memory bank is in an active state; setting the second memory bank, which is in the inactive state, as a memory bank to operate in the active state after the reset of the ECU; and resetting the ECU to cause the second memory bank to operate in the active state.

The method of updating software may further include before the downloading, checking which memory bank of the first memory bank and the second memory bank is in an active state.

The method of updating software may further include verifying integrity of the downloaded bootloader and firmware or data, in which when the integrity is verified, the setting may be performed.

The method of updating software may further include: when an error occurs after the ECU is reset, setting the first memory bank, which is in the inactive state, to a memory bank that is to operate in an active state after the ECU is reset; and resetting the ECU to cause the first memory bank to operate in the active state.

The method of updating software may further include, before the setting, checking which memory bank is in an active state.

The method of updating software may further include checking whether a communication status of the ECU is normal, in which when the communication status is normal, the setting may be performed.

The boot area may include a boot loader area for storing the boot loader and a Hardware Security Module (HSM) area for storing HSM software, and the downloading may include downloading the boot loader to the boot loader area.

The downloading may be performed by an Over-The-Air (OTA) downloading method.

The normal area may include a code area for storing the firmware and a data area for storing the data.

According to the present invention, an OTA software update may also update the boot loader in the boot area as well as the firmware or data in the flash memory.

According to the present invention, when there is an abnormality in newly downloaded firmware or data during the update of the boot loader and firmware or data in the flash memory, it is possible to recover the boot loader and firmware or data to the state before the update.

The effects of the present invention are not limited to the effects mentioned above, and other effects not mentioned will be clearly understood by those skilled in the art from the following description.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the drawings. In the following description and the accompanying drawings, substantially the same components are denoted by the same reference numerals respectively, and thus redundant descriptions will be omitted. In addition, in the description of the present invention, if it is determined that a detailed description of a related known function or configuration may unnecessarily obscure the gist of the present invention, a detailed description thereof will be omitted.

Figure 1:
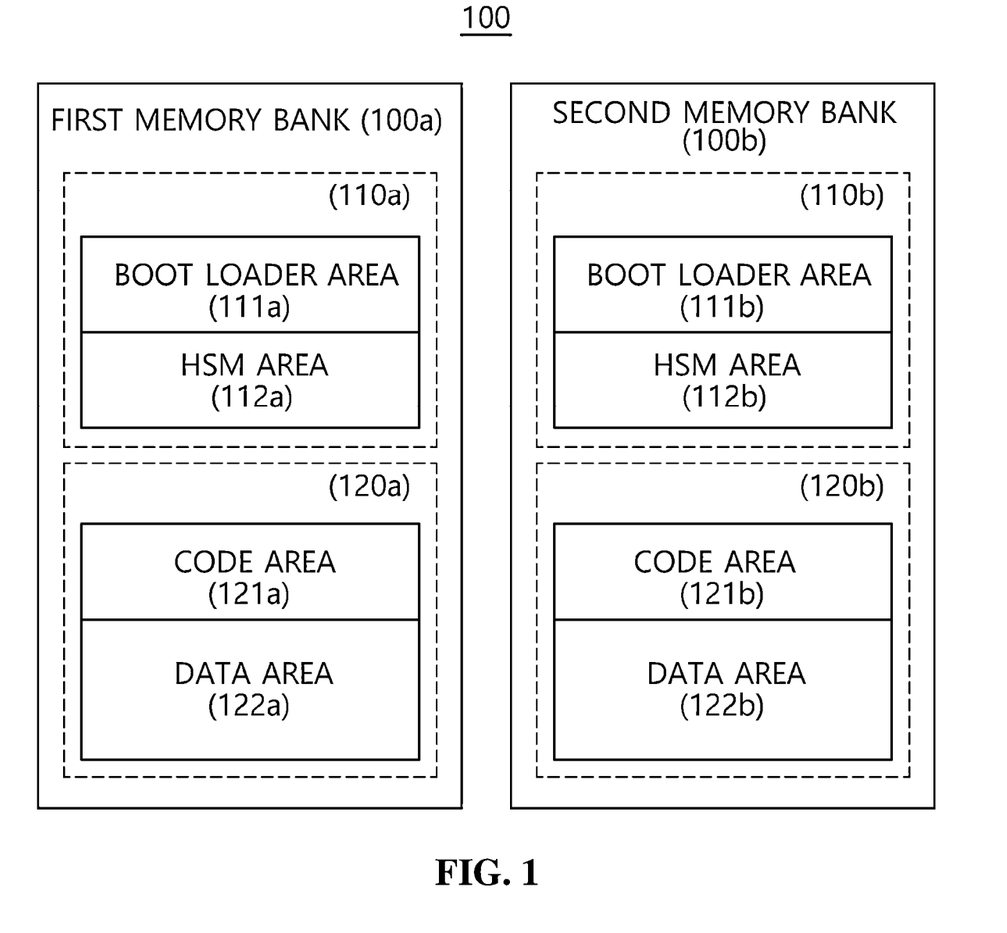
FIG. 1 illustrates a structure of a flash memory provided in an Electronic Control Unit (ECU) according to an exemplary embodiment of the present invention.

FIG. 1 illustrates a structure of a flash memory 100 provided in an Electronic Control Unit (ECU) according to an exemplary embodiment of the present invention.

The flash memory 100 according to the present exemplary embodiment includes a first memory bank 100a and a second memory bank 100b.

The first memory bank 100a includes a boot area 110a and a normal area 120a. The boot area 110a is divided into a boot loader area 111a for storing a boot loader, and a Hardware Security Module (HSM) area 112a for storing HSM-related software. An HSM is a module that enables encryption and decryption in a short time by implementing encryption-related elements in hardware, and HSM-related software may be provided in advance by the HSM manufacturer. The normal area 120a is divided into a code area 121a for storing firmware and a data area 122a for storing data.

The second memory bank 100b also includes a boot area 110b and a normal area 120b. The boot area 110b is divided into a boot loader area 111b for storing a boot loader, and an HSM area 112b for storing HSM-related software. The normal area 120b is divided into a code area 121b for storing firmware and a data area 122b for storing data.

In the present exemplary embodiment of the present invention, when one of the first memory bank 100a and the second memory bank 100b is operated in an active state (hereinafter referred to as the "active memory bank"), the other is operated in an inactive state (hereinafter referred to as the "inactive memory bank"). For example, when the first memory bank 100a is operated in the active state, the second memory bank 100b is operated in the inactive state. Conversely, when the second memory bank 100b is operated in the active state, the first memory bank 100a is operated in the inactive state.

Which memory bank of the first memory bank 100a and the second memory bank 100b is to be activated after booting or reset of the ECU may be preset in the ECU, for example, set in a Unit Control Block (UCB) of the ECU.

In the software update according to the exemplary embodiment of the invention, the software for the update is downloaded to the inactive memory bank. The software download may be performed by an OTA method.

Figure 2:
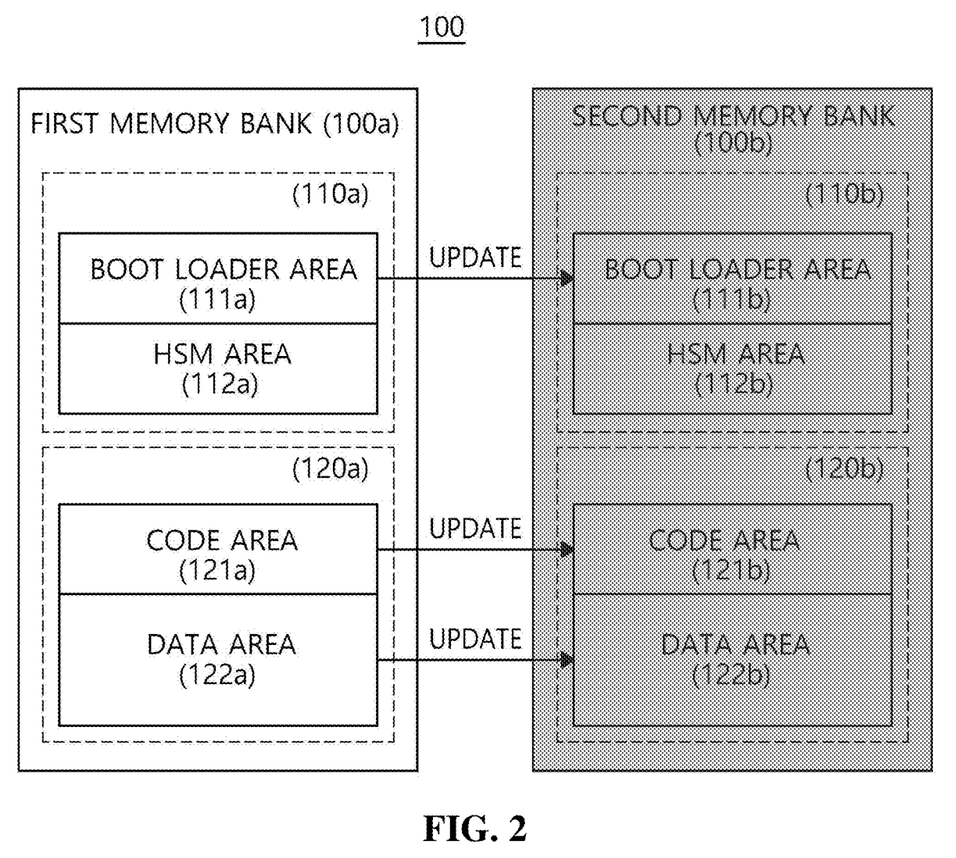
FIG. 2 illustrates the entire software being downloaded to an inactive second memory bank when a first memory bank is in an active state.

FIG. 2 illustrates the entire software being downloaded to the inactive second memory bank 100b when the first memory bank 100a is in an active state.

Referring to FIG. 2, a boot loader may be downloaded to the boot loader area 111b, firmware may be downloaded to the code area 121b, and data may be downloaded to the data area 122b of the second memory bank 100b in the inactive state. The HSM area 112b stores HSM-related software provided by the HSM manufacturer and therefore the software may not be subject to update.

After the download of the boot loader, the firmware, and the data to the boot loader area 111b, the code area 121b, and the data area 122b of the second memory bank 100b, respectively, is complete, the second memory bank 100b may be set in the UCB as the memory bank to operate in the active state after the reset of the ECU. Then, when the ECU is reset, the second memory bank 100b becomes the active memory bank, and the boot loader, the firmware, and the data may all be updated.

Figure 3:
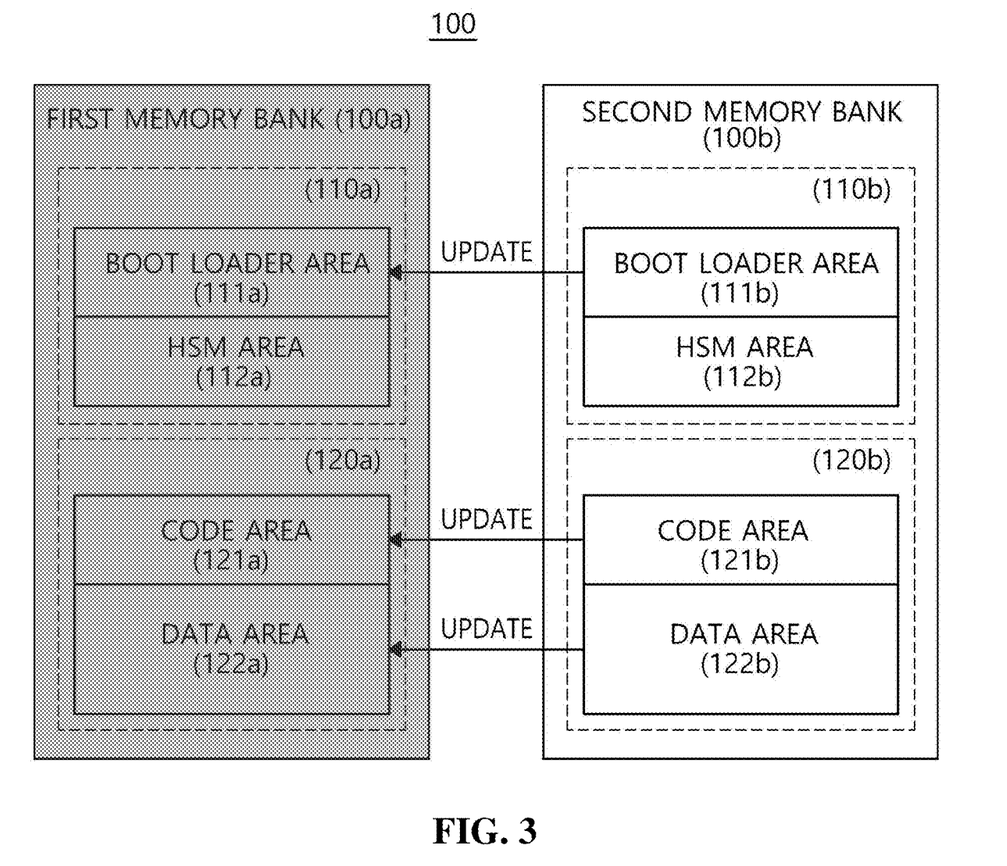
FIG. 3 illustrates the entire software being downloaded to the inactive first memory bank when the second memory bank is an active state.

FIG. 3 illustrates the entire software being downloaded to the inactive first memory bank 100a when the second memory bank 100b is an active state.

Referring to FIG. 3, a boot loader may be downloaded to the boot loader area 111a, firmware may be downloaded to the code area 121a, and data may be downloaded to the data area 122a of the first memory bank 100a in the inactive state. The HSM area 112a stores HSM-related software provided by the HSM manufacturer and therefore the software may not be subject to update.

After the download of the boot loader, the firmware, and the data to the boot loader area 111a, the code area 121a, and the data area 122a of the first memory bank 100a, respectively, is complete, the first memory bank 100a may be set in the UCB as the memory bank to operate in the active state after the reset of the ECU. Further, when the ECU is reset, the first memory bank 100a becomes the active memory bank, and the boot loader, firmware, and data may all be updated.

In the exemplary embodiment of the present invention, as shown in FIG. 2, the second memory bank 100b with the entire software downloaded is activated and the software is updated to the boot loader area 111b, the code area 121b, and the data area 122b of the second memory bank 100b, but abnormality may occur in the firmware or data in the code area 121b or the data area 122b of the second memory bank 100b due to a malicious attack or the like. In such cases, in the exemplary embodiment of the present invention, the first memory bank 100*a* is operated as an active memory bank, so that the software may return to the state before the update again. The foregoing operation will be referred to herein as a "recovery operation". The function for the recovery operation may be further implemented in the boot loader. To again operate the first memory bank 100*a* as the active memory bank, the first memory bank 100*a* may be set in the UCB as the memory bank to operate in the active state after an ECU reset. Then, when the ECU is reset, the first memory bank 100*a* may become the active memory bank and return to the state before the update.

In the exemplary embodiment of the present invention, as shown in FIG. 3, the first memory bank 100*a* with the entire software downloaded is activated and the software is updated to the boot loader area 111*a*, the code area 121*a*, and the data area 122*a* of the first memory bank 100*a*, but an abnormality may occur in the code area 121*a* or the data area 122*a* of the first memory bank 100*a* due to a malicious attack or the like. In such a case, in the exemplary embodiment of the present invention, the second memory bank 100*b* is operated again as the active memory bank through the recovery operation, so that the software may return to the state before the update. To operate the second memory bank 100*b* as the active memory bank again, the second memory bank 100*b* may be set in the UCB as the memory bank to operate in the active state after the reset of the ECU. Then, when the ECU is reset, the second memory bank 100*b* may become the active memory bank and return to the state before the update.

Figure 4:
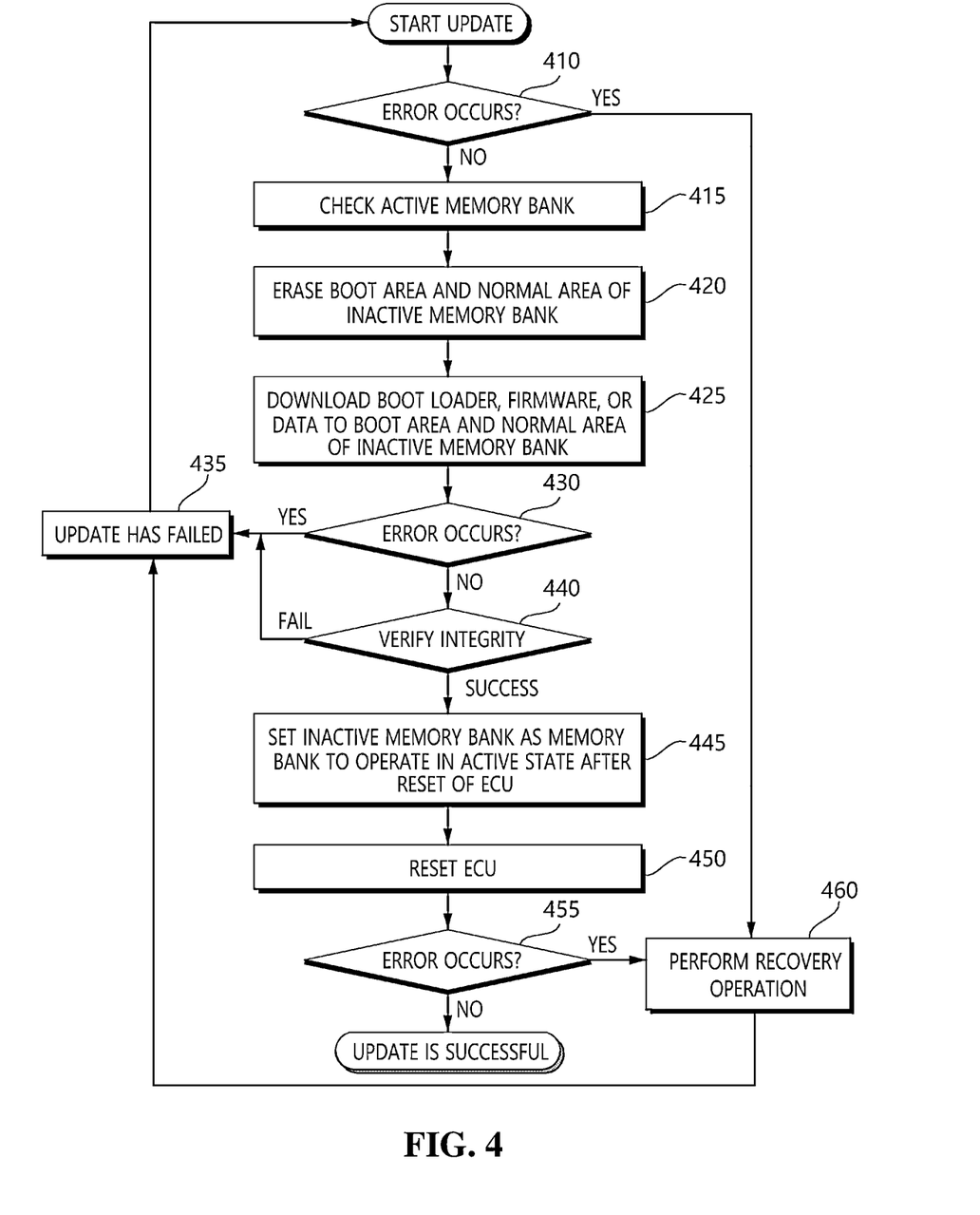
FIG. 4 is a flowchart of a method of updating software of an ECU according to an exemplary embodiment of the present invention.

FIG. 4 is a flowchart of a method of updating software of an ECU according to the exemplary embodiment of the present invention. The method of updating software according to the exemplary embodiment of the present invention may be implemented in a boot loader.

When an update starts and an error occurs (or when a user determines that an error occurs and makes a request) (operation 410), the method of updating software proceeds to operation 460 to perform a recovery operation. The recovery operation is described below with reference to FIG. 5.

When the update starts and no errors occur, it is checked which of the first memory bank 100*a* and the second memory bank 100*b* is the active memory bank in operation 415. For convenience, it is assumed that the first memory bank 100*a* is the active memory bank and the second memory bank 100*b* is the inactive memory bank.

In operation 420, the boot area 110*b* and the normal area 120*b* of the inactive memory bank, that is, the second memory bank 100*b*, are erased. Here, for the boot area 110*b*, only the boot loader area 111*b* may be erased, excluding the HSM area 112*b*.

In operation 425, the boot loader and firmware or data are downloaded to the boot area 110*b* and the normal area 120*b* of the inactive memory bank, that is, the second memory bank 100*b*. Here, the boot loader may be downloaded to the boot loader area 111*b*, the firmware may be downloaded to the code area 121*b*, and the data may be downloaded to the data area 122*b*.

When an error occurs during the download process (or when the user determines that an error has occurred and makes a request) (operation 430), the method of updating software proceeds to operation 435 and it is determined that the update has failed. Then, the first memory bank 100*a* may still operate as the active memory bank, and the update may start again at a later time.

When no errors occurred during the download process, the method of updating software proceeds to operation 440 to verify the integrity of the boot loader, the firmware, and the data downloaded to the inactive memory bank, that is, the second memory bank 100*b*. The integrity verification may be performed by using, for example, a Cyclic Redundancy Check (CRC), an electronic signature, or the like.

When the integrity verification fails, the method of updating software proceeds to operation 435 and it is determined that the update has failed. Then, the first memory bank 100*a* may still operate as the active memory bank, and the update may start again at a later time.

When the integrity verification is successful, the method of updating software proceeds to operation 445 to set the inactive memory bank, that is, the second memory bank 100*b*, as the memory bank to be operated in the active state after the reset of the ECU. Here, the setting of the memory bank to be operated in the active state after the reset of the ECU may be set in the UCB of the ECU.

Then, in operation 450, the ECU is reset. When the ECU is reset, the second memory bank 100*b* becomes the active memory bank and the first memory bank 100*a* becomes the inactive memory bank according to the setting in operation 445.

When an error occurs after the reset of the ECU (or when the user determines that an error has occurred and makes a request) (operation 455), the method of updating software proceeds to operation 460 to perform a recovery operation. The occurrence of the error after the reset of the ECU through operations 410 to 450 means that there is an abnormality in the firmware or data in the code area 121*b* or the data area 122*b* of the second memory bank 100*b* due to a malicious attack or the like. Therefore, in this case, the recovery operation is performed so that the software may return to the state before the update by operating the first memory bank 100*a* as the active memory bank again.

When no errors occur after the reset of the ECU, the update is successfully completed.

Figure 5:
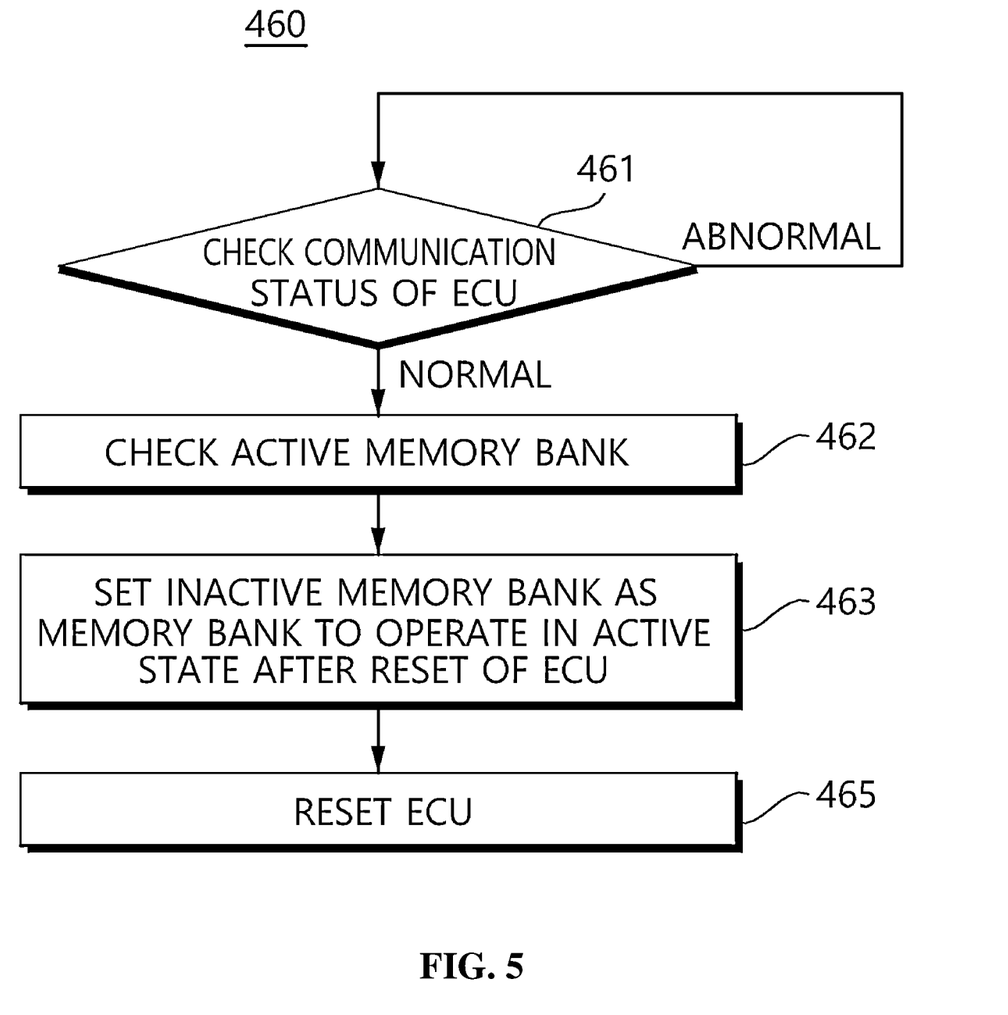
FIG. 5 is a flow diagram specifically illustrating a recovery operation in operation 460.

FIG. 5 is a flow diagram specifically illustrating the recovery operation in operation 460.

In operation 461, the communication status of the ECU is checked. The fact that the communication status of the ECU (CAN communication or Ethernet communication) is normal means that the boot loader of the boot area 110*b* of the active memory bank, that is, the second memory bank 100*b*, is functioning normally and therefore the recovery operation may be performed by the boot loader. The abnormal communication state of the ECU is an exceptional case, and may occur, for example, due to a momentary power off, but the communication state of the ECU may return to normal again when the power is restored.

When the communication status of the ECU is normal, in operation 462, it is checked which of the first memory bank 100*a* and the second memory bank 100*b* is the active memory bank. Here, the second memory bank 100*b* becomes the active memory bank because the ECU was reset after the second memory bank 100*b* was set as the memory bank to operate in the active state after the reset of the ECU in operations 445 and 450.

In operation 463, the inactive memory bank, that is, the first memory bank 100*a*, is set as the memory bank that is to be operated in the active state after the reset of the ECU.

Then, in operation 465, the ECU is reset. When the ECU is reset, the first memory bank 100*a* becomes the active memory bank and the second memory bank 100*b* becomes the inactive memory bank according to the setting in operation 463, so that the software returns to the state before the update.

Then, in operation 435, the update is determined to have failed, and the first memory bank 100*a* still operates as the active memory bank, and the update may start again at a later time.

Combinations of each block in the block diagram and each operation in the flowchart attached to the present invention may be performed by computer program instructions. These computer program instructions may be mounted in a processor of a general purpose computer, special purpose computer, or other programmable data processing equipment, so that the instructions executed by the processor of the computer or other programmable data processing equipment generate means for performing the functions described in each block of the block diagram or in each operation of the flowchart. These computer program instructions may also be stored in a computer-usable or computer-readable memory that may direct a computer or other programmable data processing equipment to implement a function in a particular manner, so that it is also possible that the instructions stored in the computer-usable or computer-readable memory produce articles containing instruction means for performing the function described in each block of the block diagram or in each operation of the flowchart. The computer program instructions may also be mounted on a computer or other programmable data processing equipment, so that the instructions for performing a computer or other programmable data processing equipment by performing a series of operational operations on a computer or other programmable data processing equipment to create a computer-executed process to perform the computer or other programmable data processing equipment may provide operations for executing functions described in in each block of the block diagram and each operation of the flowchart.

Each block or each operation may represent a portion of modules, segments, or codes including one or more executable instructions for executing specified logical function(s). It should also be noted that in some alternative exemplary embodiments, it is also possible for the functions mentioned in blocks or operations to occur out of order. For example, it is possible that two blocks or operations illustrated one after another may in fact be performed substantially simultaneously, or that the blocks or operations may sometimes be performed in the reverse order according to the corresponding function.

Although a preferred exemplary embodiment of the present invention has been described for illustrative purposes, those skilled in the art will appreciate that various modifications, additions and substitutions are possible, without departing from the scope and spirit of the invention as disclosed in the accompanying claims. Accordingly, the exemplary embodiments disclosed in the present invention are not intended to limit the technical spirit of the present invention, but to illustrate, and the scope of the present invention is not limited by the exemplary embodiment. The scope of the present invention shall be construed on the basis of the accompanying claims in such a manner that all of the technical ideas included within the scope equivalent to the claims belong to the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of updating software of an Electronic Control Unit (ECU), wherein a flash memory of the ECU includes a first memory bank and a second memory bank, each of the first memory bank and the second memory bank includes a boot area for storing a boot loader and a normal area for storing firmware or data, and when one of the first memory bank and the second memory bank operates in an active state, a remaining one of the first memory bank and the second memory bank operates in an inactive state, the method comprising:
    downloading the boot loader to the boot area of the second memory bank in an inactive state, and downloading the firmware or data to the normal area of the second memory bank, when the first memory bank is in an active state, wherein when a download error occurs during the downloading of the boot loader to the boot area of the second memory bank, the updating software of the ECU is determined as a failure, the first memory bank is continually operated in the active state, and the updating software is restarted after a threshold period;
    setting the second memory bank, which is in the inactive state, as a memory bank to operate in the active state after a reset of the ECU; and
    resetting the ECU to cause the second memory bank to operate in the active state, when a reset error occurs after the resetting of the ECU, the ECU is configured to cause the first memory bank, which is in the inactive state, to operate in the active state.

2. The method of claim 1, further comprising:
    prior to the downloading, checking which memory bank of the first memory bank and the second memory bank is in the active state.

3. The method of claim 1, further comprising:
    verifying integrity of the downloaded boot loader and firmware or data,
    wherein when the integrity is verified, the setting is performed.

4. The method of claim 1, further comprising:
    prior to the setting, checking which of the first memory bank and the second memory bank is in the active state.

5. The method of claim 1, further comprising:
    checking whether a communication status of the ECU is normal,
    wherein when the communication status is normal, the setting is performed.

6. The method of claim 1, wherein the boot area includes a boot loader area for storing the boot loader and a Hardware Security Module (HSM) area for storing HSM software, and
    the downloading includes downloading the boot loader to the boot loader area.

7. The method of claim 1, wherein the downloading is performed by an Over-The-Air (OTA) downloading method.

8. The method of claim 1, wherein the normal area includes a code area for storing the firmware and a data area for storing the data.

* * * * *